P. MILLER.
CURRY-COMB.

No. 191,608.  Patented June 5, 1877.

Attest:
C. A. Snow,
M. S. Ditmer.

Inventor:
Peter Miller
by Louis Bagger & Co.
Attorneys

UNITED STATES PATENT OFFICE.

PETER MILLER, OF CHICAGO, ILLINOIS.

IMPROVEMENT IN CURRY-COMBS.

Specification forming part of Letters Patent No. 191,608, dated June 5, 1877; application filed March 6, 1877.

*To all whom it may concern:*

Be it known that I, PETER MILLER, of Chicago, in the county of Cook and State of Illinois, have invented certain new and useful Improvements in Curry-Combs; and I do hereby declare that the following is a full, clear, and exact description thereof, which will enable others skilled in the art to which it appertains to make and use the same, reference being had to the accompanying drawings, which form a part of this specification, and in which—

Figure 1:
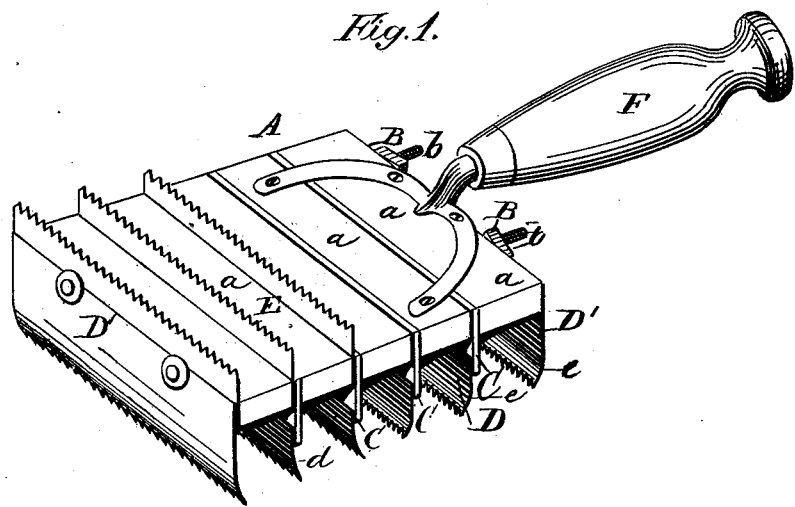
Figure 2:
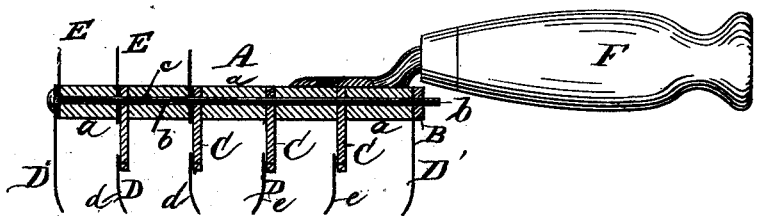
Figure 3:
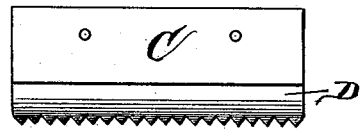

Figure 1 is a perspective view, Fig. 2 is a longitudinal section, and Fig. 3 is a plan view, of one of the rows of teeth, with its rubber strap detached.

Similar letters of reference indicate corresponding parts in all the figures.

My invention relates to flexible or elastic curry-combs; and it consists in the combination of a series of flexible and adjustable rows of teeth, with two rigid rows, substantially as hereinafter more fully shown and described.

In the drawing, A is the body of my improved curry-comb. This I make of a number of pieces or blocks of wood, metal, or other suitable material, $a a'$, the width of each of which is nearly equal to the distance it is desired to leave between the rows of teeth. The blocks $a a$ are held together by means of bolts $b b$, which pass through perforations $c c$, and are provided with nuts B B for tightening the pieces together.

Between each of the blocks $a a$ I insert a strap, C, of india-rubber, leather, or other suitable material, rubber, however, being preferable, on account of its superior elasticity. These straps may be either strung upon the bolts $b b$, as shown in the drawing, or they may be simply clamped between the blocks $a a$, and secured by tightening the nuts B B.

To each of the straps C I secure, by rivets, or in any other suitable manner, a row of teeth, consisting of a strip of sheet metal, D, in which the teeth are cut in the usual manner.

In the drawing I have shown four such rubber straps, each having a row of teeth. The two front rows of teeth I bend slightly backward, and the two rear rows I bend in the opposite direction, as shown at $d e$, respectively. The object of this is to cause the teeth—even when the entire row "gives," owing to the elastic backing—to operate with unimpaired efficiency.

At the two ends of the curry-comb, upon the outside of the first and last of the blocks $a$, I secure the rows of rigid teeth D', direct, without any intermediate elastic backing. These two rigid rows of teeth are for the purpose of stirring the hair of the horse on the forward and backward motions of the curry-comb, the elastic rows of teeth serving to remove the loose hair, &c.

Between the foremost of the blocks $a a$, and facing the back of the comb, I secure a few—say, three or four—rows of rigid teeth, E E, these being for the purpose of doing the preliminary rough cleaning. A suitable handle, F, is secured to the back of the comb by screws or otherwise.

The advantages of my improved curry-comb will be readily understood from the foregoing description. The elastic backing of the rows of teeth D renders its operation smooth and easy, while at the same time the hair, being stirred by the rigid teeth D' D', is quite as effectually cleaned of impurities as if all the teeth were rigid. If a row of teeth, or its elastic backing, is broken or injured, it may be easily removed and another substituted, by simply removing the nuts B. Finally, my improved curry-comb may be manufactured at a cost but slightly exceeding that of one of the most primitive construction.

Having thus described my invention, I claim and desire to secure by Letters Patent of the United States—

The improved curry-comb herein described, consisting of the back A, having a series of adjustable and flexible rows of teeth, C C, arranged between two rigid rows, D' D', substantially as and for the purpose hereinbefore set forth.

In testimony that I claim the foregoing as my own I have hereunto affixed my signature in presence of two witnesses.

PETER MILLER.

Witnesses:
GEO. BRAHAM,
JAS. W. KENNEDY.